US011890729B2

(12) United States Patent
Hsiao

(10) Patent No.: US 11,890,729 B2
(45) Date of Patent: Feb. 6, 2024

(54) TOOL HEAD WITH ANTI-SLIP STRUCTURE

(71) Applicant: YUN CHAN INDUSTRY CO., LTD., New Taipei (TW)

(72) Inventor: Fu-Jui Hsiao, New Taipei (TW)

(73) Assignee: YUN CHAN INDUSTRY CO., LTD., New Taipei (TW)

( * ) Notice: Subject to any disclaimer, the term of this patent is extended or adjusted under 35 U.S.C. 154(b) by 247 days.

(21) Appl. No.: 16/824,693

(22) Filed: Mar. 19, 2020

(65) Prior Publication Data

US 2021/0291330 A1 Sep. 23, 2021

(51) Int. Cl.
*B25B 23/00* (2006.01)
*B25B 15/04* (2006.01)

(52) U.S. Cl.
CPC .......... *B25B 23/0035* (2013.01); *B25B 15/04* (2013.01)

(58) Field of Classification Search
CPC ............................ B25B 23/0035; B25B 15/04
USPC ............................................................ 81/460
See application file for complete search history.

(56) References Cited

U.S. PATENT DOCUMENTS 5,005,448 A * 4/1991 Main ........................ B25B 13/00 81/177.1
7,107,882 B1 * 9/2006 Chang ..................... B25B 15/02 81/125
7,143,670 B2 * 12/2006 Geary ................... B25B 13/481 81/177.2
8,359,953 B2 * 1/2013 Lin ......................... B25B 13/06 81/177.85
8,631,724 B2 * 1/2014 Miyata .................. B25B 13/488 81/124.5
9,718,174 B2 * 8/2017 Tsai ........................ B25B 15/00
2010/0275741 A1 * 11/2010 Lai ........................ B25B 15/001 81/438

* cited by examiner

*Primary Examiner* — Hadi Shakeri
(74) *Attorney, Agent, or Firm* — Leong C. Lei

(57) ABSTRACT

A tool head with an anti-slip structure includes a combination segment formed on one side of the tool head, a driving segment formed on another side of the tool head, a groove segment formed the tool head and positioned between the combination segment and driving segment, and an anti-slip structure configured on the tool head and positioned between the groove segment and driving segment. With the anti-slip structure of a high friction coefficient and the groove segment, the friction can be increased so as to allow users to easily and quickly draw the tool head out of the hole of a removal tool.

9 Claims, 7 Drawing Sheets

TOOL HEAD WITH ANTI-SLIP STRUCTURE

(a) TECHNICAL FIELD OF THE INVENTION

The present invention relates to a tool head with an anti-slip structure, and more particularly to a tool head with an anti-slip structure capable of being quickly and easily removed from the hole of a removal tool by increasing friction with a high friction coefficient thereof.

(b) DESCRIPTION OF THE PRIOR ART

Before using a removal tool such as a socket or a ratchet wrench that requires the installment of a tool head, the tool head must be snapped into the hole of the removal tool, and it needs to be removed from the hole after use. However, in order to make conventional removal tools remain stable and avoid the tool head from falling off upon removal, the tool head is combined by means of tight engagement or strong magnetic adsorption, which causes the tool head to be difficultly pulled out, or even completely stuck in the hole after use.

SUMMARY OF THE INVENTION

The main object of the present invention is to provide a tool head with an anti-slip structure, increasing friction through the anti-slip structure of a high friction coefficient, and allowing users to quickly and easily remove the tool head from the hole of a removal tool with the recessed design of a groove segment.

To achieve the above object, the present invention proposes a tool head with an anti-slip structure, including: a combination segment, formed on one side of the tool head; a driving segment, formed on another side of the tool head away from the combination segment, and a driving portion configured on one end of the driving segment away from the combination segment; a groove segment, formed on the tool head and positioned between the combination segment and driving segment; an anti-slip structure, configured on the tool head and positioned between the groove segment and driving segment, and a diameter of the groove segment is smaller than diameters of the anti-slip structure and combination segment, respectively; a plurality of convex portions, each thereof formed on the anti-slip structure; a plurality of concave portions, each thereof formed on the anti-slip structure and enclosed by the convex portions; and an abutting surface, defined on one side of the groove segment adjacent to the anti-slip structure.

With the above structure, the tool head of the present invention can be installed in the hole of a removal tool when a bolt wants to be removed, and the driving portion of the driving segment is matched and engaged with the bolt; the removal tool is then rotated to allow the tool head to remove the bolt. When the tool head wants to be taken out from the hole after the removal of the bolt, a user's fingers are attached to and hold the anti-slip structure and groove segment. At this time, the surface of the anti-slip structure becomes coarse because of the convex portions and concave portions thereof; high roughness means high friction coefficient so that the friction between the fingers and anti-slip structure is increased.

In addition, the diameter of the groove portion is smaller than the ones of the anti-slip structure and combination segment on the two sides thereof, allowing the fingers to be placed on the groove segment, and further abutted to the abutting surface to generate a support effect during drawing out the tool head. With the cooperation between the anti-slip structure and groove segment, the friction can be increased during the removal of the tool head, thereby allowing the tool head to be easily and quickly removed out of the hole of the removal tool.

With the above the technology, the present invention can overcome the disadvantages of the prior art that a tool head is difficult to be drawn out of the hole of a removal tool and even stuck in the hole after use.

DETAILED DESCRIPTION OF THE PREFERRED EMBODIMENTS

Figure 1:
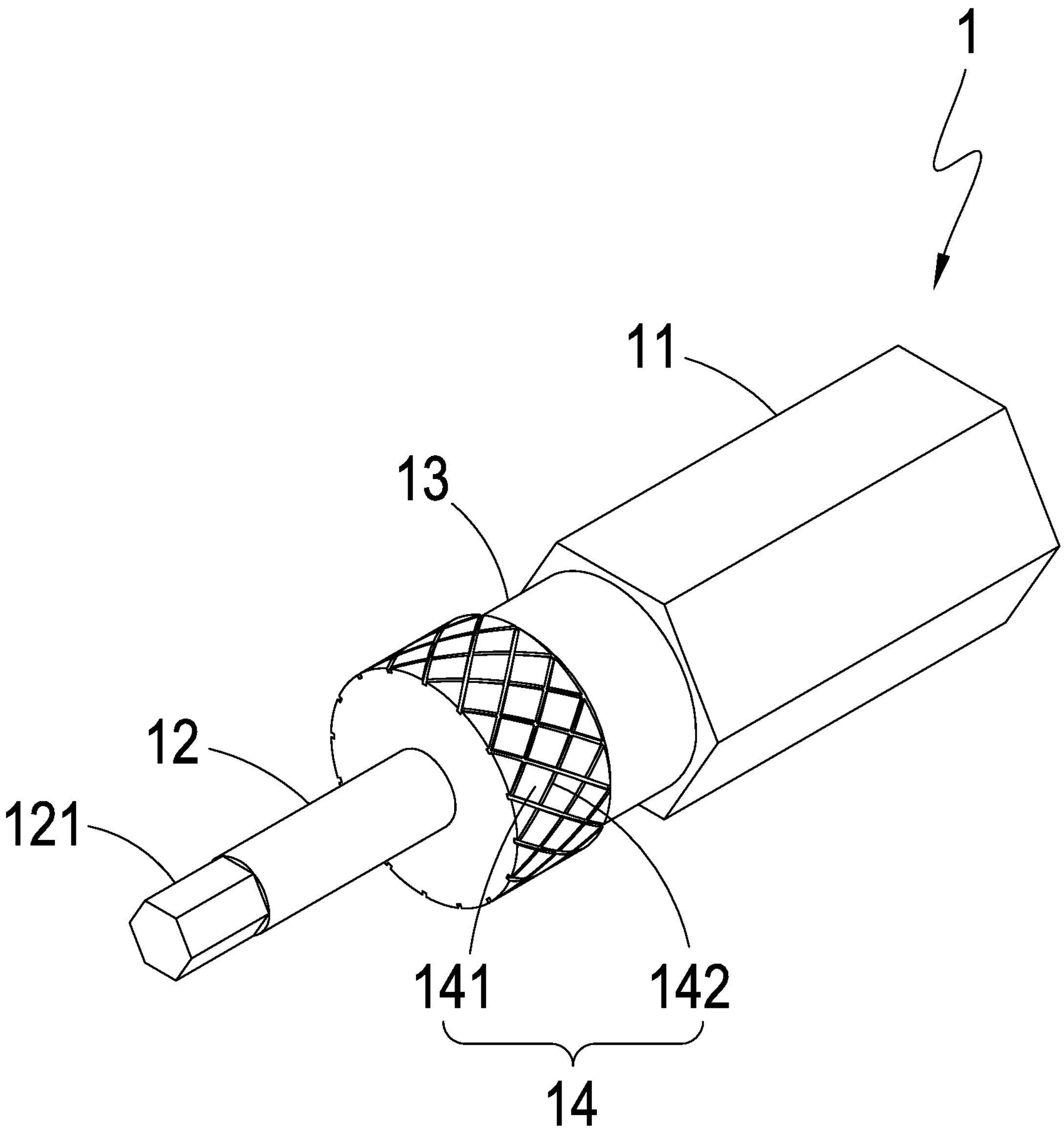
FIG. 1 is a perspective view of a preferred embodiment of the present invention.
Figure 2:
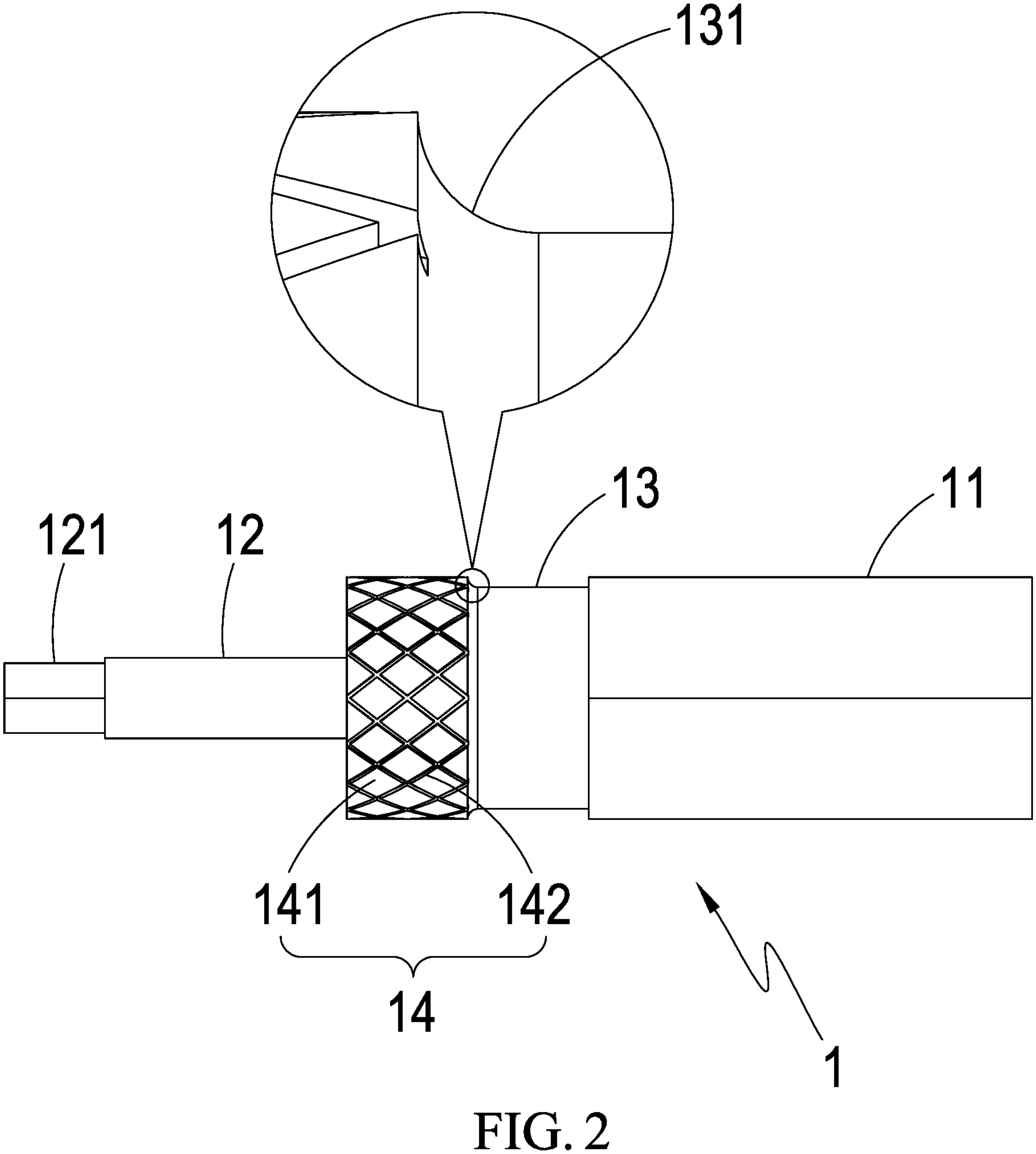
FIG. 2 is a side view of the embodiment of the present invention.

Referring to FIGS. 1 and 2, a tool head 1 with an anti-slip structure of the present invention includes a combination segment 11, driving segment 12, groove segment 13, anti-slip structure 14, a plurality of convex portions 141, a plurality of concave portions 142, and an abutting surface 131 where the combination segment 11 is formed on one side of the tool head 1; the driving segment 12 is formed on another side of the tool head 1 away from the combination segment 11, and a driving portion 121 is configured on one end of the driving segment 12 away from the combination segment 11; the groove segment 13 is formed on the tool head 1, and positioned between the combination segment 11 and the driving segment 12; the anti-slip structure 14 is configured on the tool head 1 and positioned between the groove segment 13 and driving segment 12, where the diameter of the groove segment 13 is smaller than the one of the anti-slip structure 14 and the one of the combination segment 11, respectively; the plurality of convex 141 are formed on the anti-slip structure 14; and the plurality of concave portion 142 are formed on the anti-slip structure 14, and each of the convex portions 142 is enclosed by the concave portions 142; and the abutting surface 131 is defined on the groove section 13 adjacent to one side of the anti-slip structure 14.

Furthermore, each of the convex portions 141 is a rhomboid as an example, and the concave portions 142 are lines that cross each other to make them look like a net. In addition, the driving portion 121 is hexagonal as an example, and the combination segment 11 may also be hexagonal; the abutting surface 131 is a circular arc surface as an example.

With the corresponding cooperation of the above structure of the present invention, high friction coefficient can be used to increase friction force upon the removal of the tool head 1 from the removal tool 2, and further to allow a user to quickly and easily remove the tool head 1 out of the hole of the removal tool 2. The detailed explanation will be described as the following.

Figure 3:
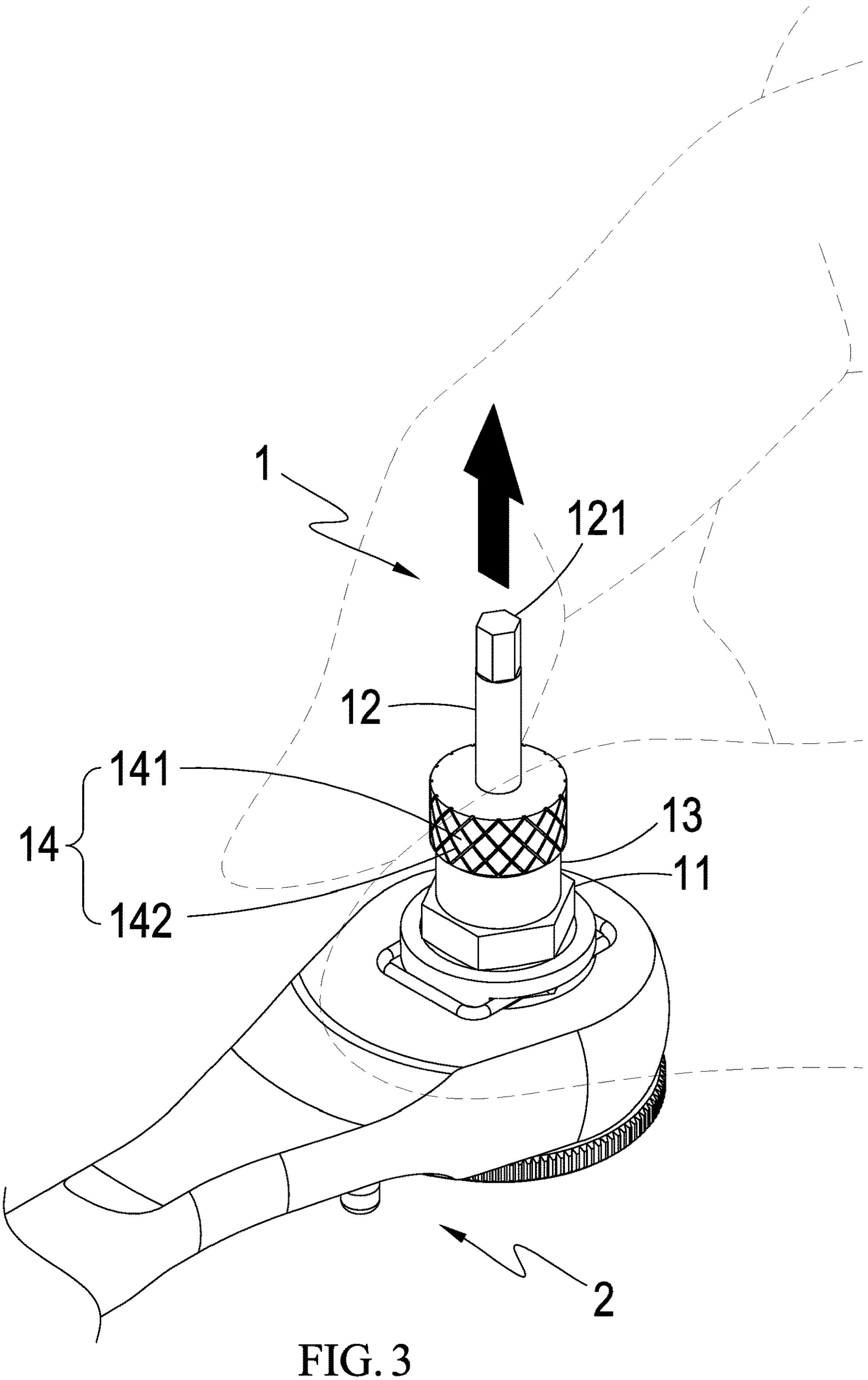
FIG. 3 is a perspective view of the embodiment of the present invention during removal.

Referring to FIGS. 1 to 3, the external structure of the combination segment 11 is first used to install the tool head 1 in the hole of a removal tool 2 upon the removal of a bolt. In a preferred embodiment, the removal tool 2 is a ratchet wrench, but the present invention is not so limited. Next, the removal tool 2 is operated to allow the driving portion 121 of the driving segment 12 to be aligned with the bolt, and the bolt can then be removed.

After the removal of the bolt is completed, a user's fingers may first pinch the anti-slip structure 14 and groove section 13 of the tool head 1 when the tool head 1 wants to be taken out from the hole of the removal tool 2. At this time, the fingers can be tightly attached to the groove segment 13 since the diameter of the groove section 13 is smaller than the ones of the anti-slip structure 14 and combination segment 11, respectively, and in the meantime, with the cooperation of the convex portions 141 and concave portions 142 of the anti-slip structure 14, the roughness of the anti-slip structure 14 can be increased to allow the anti-slip structure 14 to have a higher friction coefficient to increase the friction force acted on the surfaces of the fingers by the anti-slip structure 14. In addition, when a force is acted outward to pull out the tool head 1 from the removal tool 2, the fingers placed on the groove segment 13 will abut on the abutting surface 131, thereby allowing the abutting surface to be used as a support surface upon the pulling Therefore, the user can then easily and quickly remove the tool head 1 out of the hole of the removal tool 2.

Friction is an essential attribute of two objects with relative motion or relative motion tendency; when an object and another object move along the tangential direction of the contact surface or have a tendency to move relative to each other, a force that hinders their relative movement is formed between the contact surfaces of the two objects, that is, friction.

The friction coefficient is the ratio of the friction force to the forward pressure between two solid surfaces. The coefficient of friction is determined by factors such as the nature and roughness of the sliding surface, and has nothing to do with the size of the contact area. The rougher the sliding surface, the larger the coefficient of friction. Therefore, the convex portions 141 and concave portions 142 on the anti-slip structure 14 allow the surface of the anti-slip structure 14 itself to be coarse and have a higher friction coefficient; when the fingers are attached to the anti-slip structure 14 and a force is to be applied, the anti-slip structure 14 presents a network of unevenness, which will generate a large amount of friction with the surfaces of the fingers so that a user does not need to exert an excessive force and uses the friction generated between the fingers and anti-slip structure 14, and the tool head 1 can then be removed from the removal tool 2, achieving a quick and easy tool head removal effect.

Figure 4:
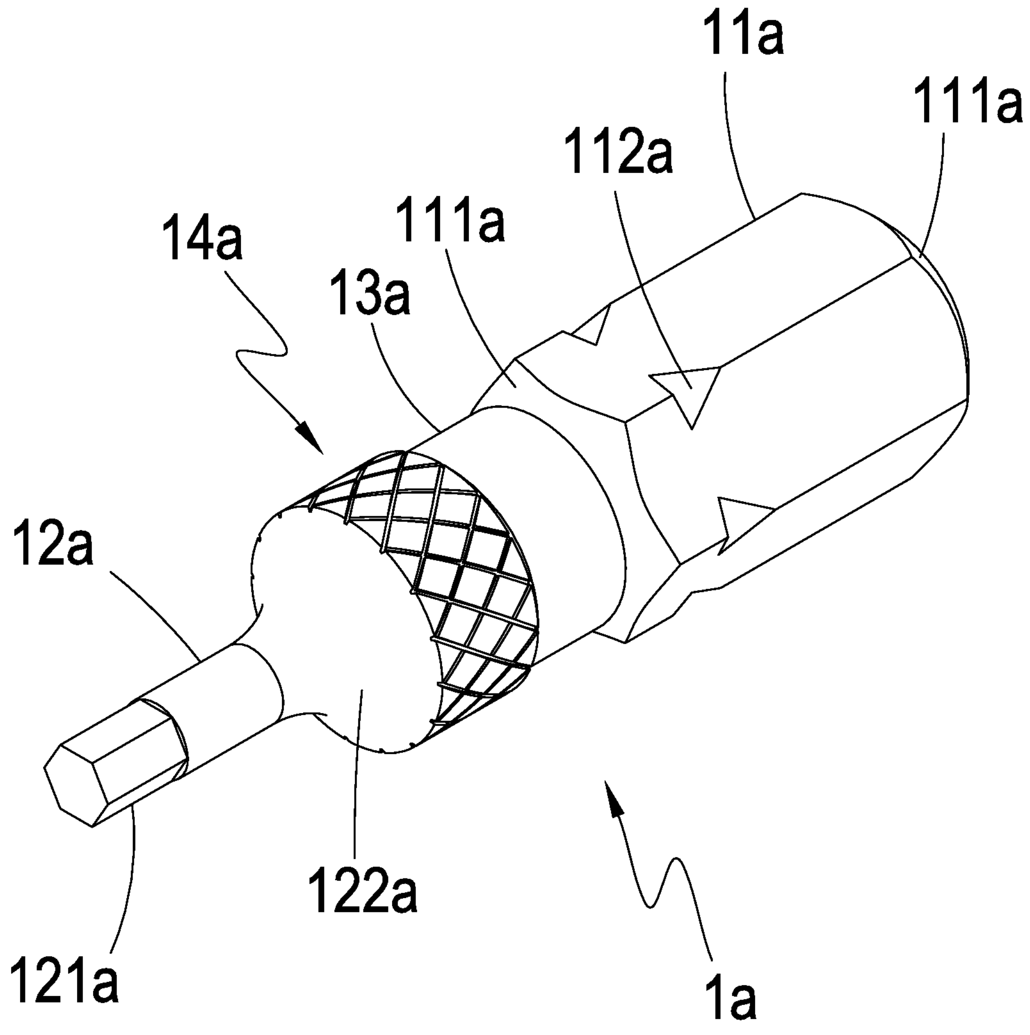
FIG. 4 is a perspective view of another preferred embodiment of the present invention.
Figure 5:
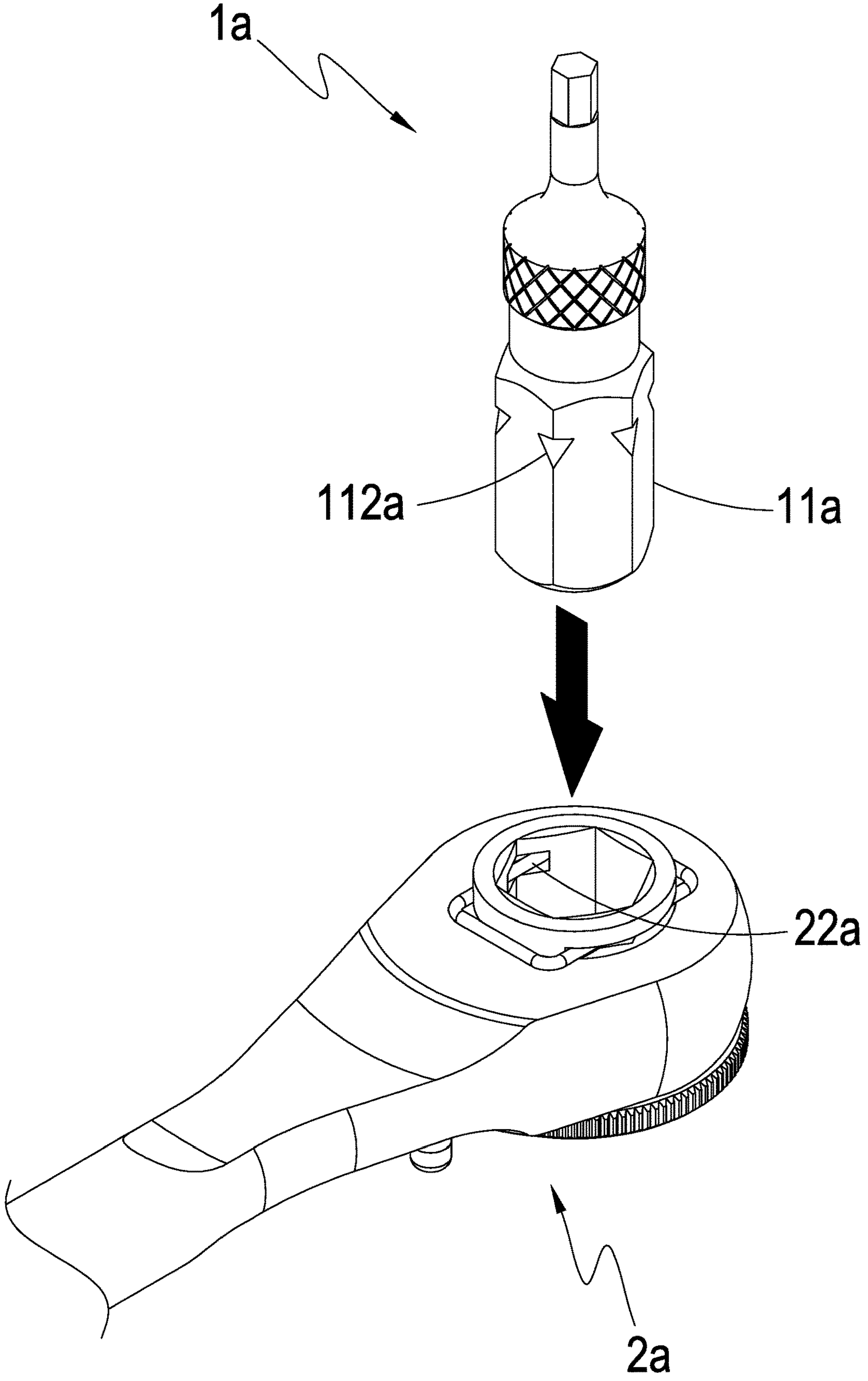
FIG. 5 is a perspective view of the present invention upon the engagement with a removal tool.
Figure 6:
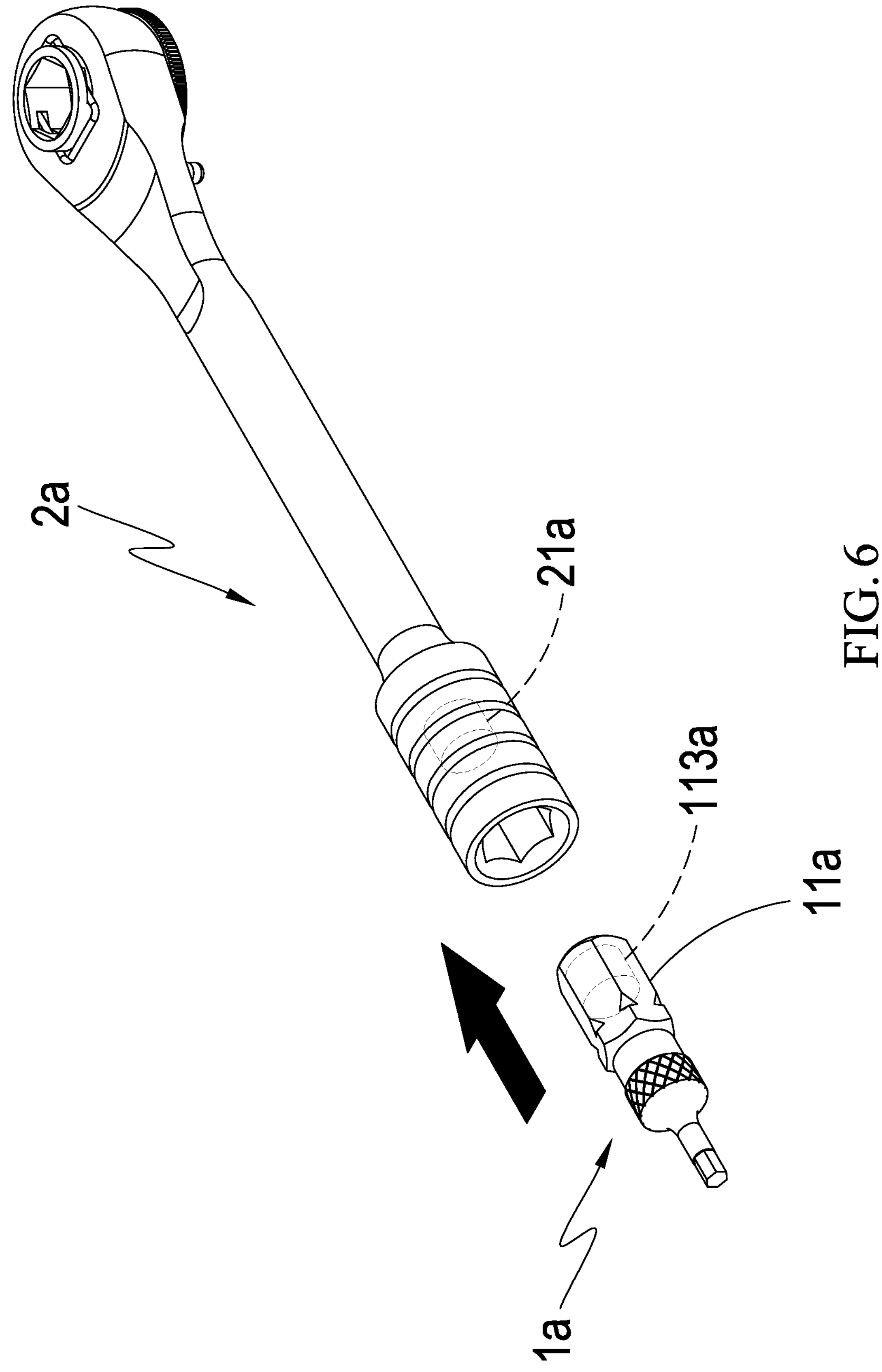
FIG. 6 is a perspective view of the present invention when engaged with a removal tool by means of magnetic suction.

Referring to FIGS. 4 to 6, which show another preferred embodiment of the present invention, the present embodiment is almost similar to the above embodiment except a difference between the above embodiment and present embodiment is that in the present embodiment, the two sides of the combination segment 11*a* are respectively formed into a modified portion 111*a*, and the combination segment 11*a* is surround with a plurality of notches 112*a*; one side of the combination segment 11*a* away from the groove segment 13*a* is configured with a magnetic suction portion 113*a*. Furthermore, one side of the driving segment 12*a* adjacent to the anti-slip structure 14 is surround with and formed into a gradual contraction part 122*a*. In addition, the removal toll 2*a* further has at least one engagement portion 22*a* in corresponding engagement with the notches 112*a*, and a magnetic suction element 21*a* corresponding to the magnetic suction portion 113*a*.

Preferably, the modified portion 111*a* is a circular corner, for example, and the notch 112*a* is a triangular shape as an example; the magnetic suction portion 113*a* and magnetic suction element 21*a* respectively are a magnetic as an example; gradual contraction portion 122*a* may be curvedly contracted from the anti-slip structure 14*a* toward the driving portion 121*a*; the number of the engagement portions 22*a* is two, for example.

Whereby, with the structure of the modified portion 111*a*, the acute angle of the tool head 1*a* can be modified to avoid a user's fingers being cut by the tool head 1*a* when exerting a force on the tool head 1*a* to pull it out of the hole of the removal tool 2*a*.

With the structure of notches 112*a* in corresponding engagement with the engagement portions 22*a*, the combination of the tool head 1*a* with the removal tool 2*a* can be tighter to avoid the tool head 1*a* easily falling off the removal tool 2*a* during use.

With the structure of the magnetic suction portion 113*a* and magnetic suction element 21*a* being magnetically attracted to each other, the combination of the tool head 1*a* with the removal tool 2*a* can also be tighter to avoid the tool head 1*a* easily falling off the removal tool 2*a* during use.

In addition, since the diameter of the driving segment 12*a* is smaller than the one of the anti-slip structure 14*a*, the connection of the driving segment 12*a* with the anti-slip structure 14*a* has a higher thickness drop; if the force exerted on the tool head 1*a* is larger, the driving segment 12*a* is easy to be broken. With the structure of the gradual contraction portion 122*a*, the connection of the driving segment 12*a* with the anti-slip structure 14*a* will not have an excessive thickness drop; the connection is gradually contracted from the anti-slip structure 14*a* toward the driving portion 12*a* to increase the stability of the connection, and further to avoid an excessive force breaking the driving portion 12*a* during operation.

Figure 7:
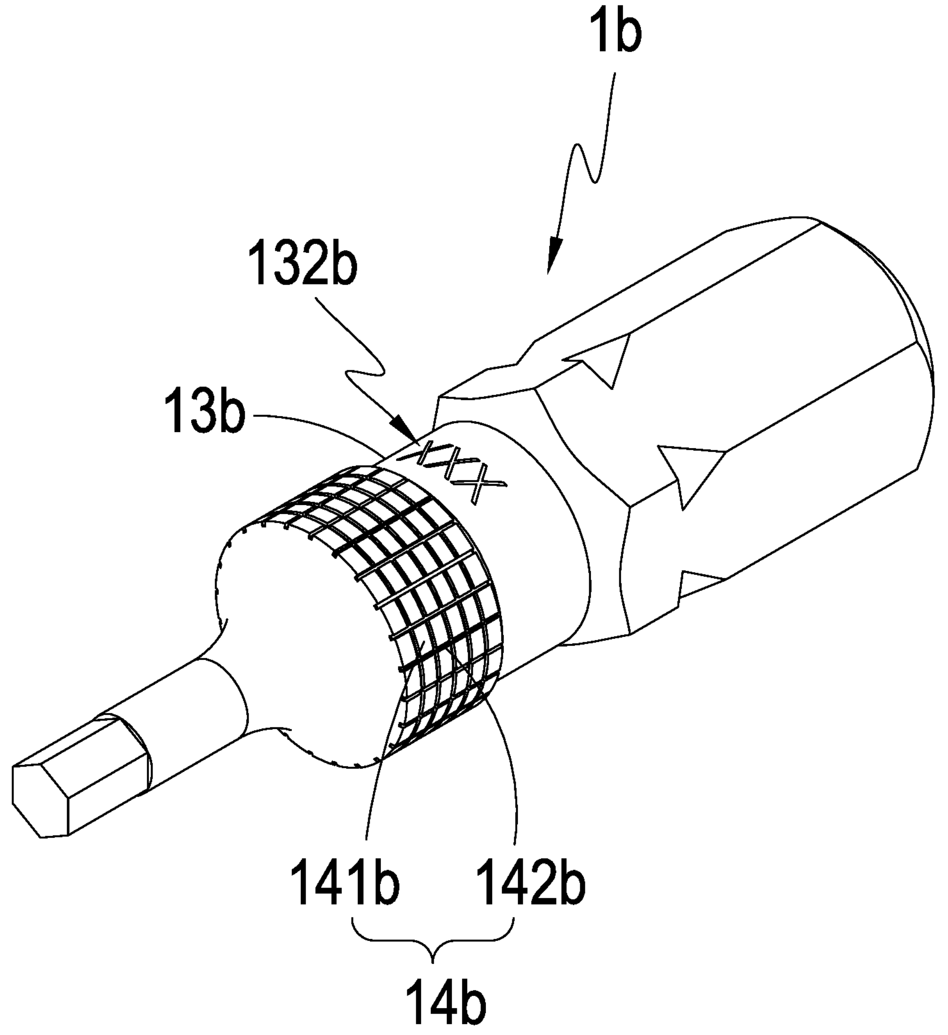
FIG. 7 is a perspective view of still another preferred embodiment of the present invention.

Referring to FIG. 7, which shows still another preferred embodiment of the present invention, the present embodiment is almost similar to the above embodiments, and the difference between the present embodiment and the above embodiments is that in the present embodiment, each of the convex portions 141*b* of the anti-slip structure 14*b* on the tool head 1*b* is changed from the original rhomboid shape to a square shape, and the concave portion 142*b* is also in the form of a network line arranged crosswise to each other, thereby presenting the implementation of a different anti-slip structure 14*b*, and proving that the present invention is not limited to the shape of the anti-slip structure 14*b*, so that users can choose a suitable anti-slip structure appearance according to the situation.

In addition, the groove segment 13*b*, in the embodiment, further has at least one indicating portion 132*b*, which is text, graphics or color for the indication of the specification of the tool head 1*b*.

Therefore, the present invention has the following advantages over the prior art:

1. the anti-slip structure 14 with a high friction coefficient allows the friction force to be increased and the tool head 1 to be quickly and easily removed out of the hole of the removal tool 2 with the recessed design of the groove segment 13;

2. a user's fingers can be avoided from being cut through the structure of the modified portion 111*a;*
3. the tool head 1*a* can be tightly combined with the removal tool 2*a* through the structures of the notches 112*a;*
4. the tool head 1*a* can be tightly combined with the removal tool 2*a* through the structure of the magnetic suction portion 113*a;*
5. the stability of the connection of the driving segment 12*a* with the anti-slip structure 14*a* can be increased through the structure of the gradual contraction portion 122*a*; and
6. the specification of the tool head 1*b* can be obviously judged through the structure of the indicating portion 132*b*.

I claim:

1. A tool head with an anti-slip structure, comprising:

a combination segment, formed on one side of said tool head;

a driving segment, formed on another side of said tool head away from said combination segment, and a driving portion formed on a distal end of said driving segment away from said combination segment;

a groove segment, formed on said tool head and positioned between said combination segment and driving segment;

an anti-slip structure, configured on said tool head and positioned between said groove segment and driving segment, and a diameter of said groove segment is smaller than diameters of said anti-slip structure and combination segment, respectively;

a plurality of convex portions, each thereof formed on said anti-slip structure; a plurality of concave portions, each thereof formed on said anti-slip structure and enclosed by said convex portions; and an abutting surface, defined on one side of said groove segment adjacent to said anti-slip structure, wherein the anti-slip structure is connected with one end of the driving segment and is connected with one end of the combination segment through the groove segment such that the anti-slip structure interfaces between and connects with the driving segment and the combination segment to have the driving segment and the combination segment combined with the anti-slip structure and movable in unison with the anti-slip structure, wherein the combination segment, the groove segment, the anti-slip structure, and the driving segment are connected together in the form of a one-piece structure, and wherein one side of the driving segment adjacent to the anti-slip structure is surrounded with a gradual contraction portion, and wherein the tool head is selectively attachable to a hand tool by means of the combination segment and is removable from the hand tool for replacement, the tool head attached to the hand tool being drivable by the hand tool to rotate and being thus adapted to drive an external object with the driving portion of the driving segment, wherein the gradual contraction portion extends between the anti-slip structure and the driving segment to achieve stability of connection between the driving segment and the anti-slip structure.

2. The tool head according to claim 1, wherein two sides of said combination portion are respectively formed into a modified portion.

3. The tool head according to claim 1, wherein a plurality of notches are formed around said combination segment.

4. The tool head according to claim 1, wherein one side of said combination segment away from said groove segment is configured with a magnetic suction portion.

5. The tool head according to claim 1, wherein said groove segment has at least one indicating portion.

6. The tool head according to claim 1, wherein the length ratio of said groove segment to said combination segment is between 1:3 to 1:4.

7. The tool head according to claim 1, wherein said plurality of convex portions are square or rhomboidal, and said plurality of concave portions are lines crossing each other so that said plurality of concave portions appear net like.

8. The tool head according to claim 1, wherein said plurality of concave portions are square or rhomboidal, and said plurality of convex portions are lines crossing each other so that said plurality of convex portions appear net like.

9. The tool head according to claim 1, wherein said driving portion is a Phillips, slotted, pozidriv, hexagonal, dodecagonal, square, or star type.

* * * * *